(12) United States Patent
Watanabe et al.

(10) Patent No.: US 6,898,486 B2
(45) Date of Patent: May 24, 2005

(54) POSITION DETECTING DEVICE AND TAKEOUT APPARATUS WITH POSITION DETECTING DEVICE

(75) Inventors: Atsushi Watanabe, Tokyo (JP); Katsutoshi Takizawa, Tokyo (JP)

(73) Assignee: Fanuc LTD, Yamanashi (JP)

( * ) Notice: Subject to any disclaimer, the term of this patent is extended or adjusted under 35 U.S.C. 154(b) by 149 days.

(21) Appl. No.: 10/290,535

(22) Filed: Nov. 8, 2002

(65) Prior Publication Data

US 2003/0088337 A1 May 8, 2003

(30) Foreign Application Priority Data

Nov. 8, 2001 (JP) ........................................ 2001-343627

(51) Int. Cl.[7] .......................... G05B 15/00; G05B 19/00
(52) U.S. Cl. ....................... 700/259; 700/245; 700/257; 700/95; 318/568.13; 382/108; 414/416.01; 72/21.4; 29/714
(58) Field of Search .......................... 700/95, 245, 259; 318/568.13; 414/416.01; 382/108, 141; 29/714; 72/21.4

(56) References Cited

U.S. PATENT DOCUMENTS

| | | | | |
|---|---|---|---|---|
| 5,379,347 A | * | 1/1995 | Kato et al. .................. | 382/141 |
| 5,467,003 A | * | 11/1995 | Kosaka et al. ......... | 318/568.13 |
| 5,566,244 A | * | 10/1996 | Kato et al. .................. | 382/108 |
| 5,727,132 A | * | 3/1998 | Arimatsu et al. ........... | 700/259 |
| 5,987,591 A | * | 11/1999 | Jyumonji .................... | 700/259 |
| 6,141,863 A | * | 11/2000 | Hara et al. ..................... | 29/714 |
| 6,328,523 B1 | * | 12/2001 | Watanabe et al. ...... | 414/416.01 |
| 6,415,191 B1 | * | 7/2002 | Pryor .......................... | 700/95 |
| 6,612,143 B1 | * | 9/2003 | Butscher et al. ............. | 72/21.4 |
| 6,665,588 B2 | * | 12/2003 | Watanabe et al. ........... | 700/259 |
| 6,732,558 B2 | * | 5/2004 | Butscher et al. ............. | 72/21.4 |
| 2003/0018414 A1 | * | 1/2003 | Watanabe et al. ........... | 700/259 |

FOREIGN PATENT DOCUMENTS

WO    WO 9724206 A1 *   7/1997

OTHER PUBLICATIONS

Wells et al., Assessing image features for vision–based robot positioning, 2001, Internet, pp. 95–118.*
Stanley et al., A fast two dimensional image based grasp planner, 1999, IEEE, pp. 266–271.*
Zheng et al., Guidance robot motion using zooming and foccusing, 1996, IEEE, pp. 1076–1082.*
Zheng et al., Active camera guided manipulation, 1991, IEEE, pp. 632–638.*

* cited by examiner

Primary Examiner—Richard M. Camby
Assistant Examiner—McDieunel Marc
(74) Attorney, Agent, or Firm—Staas & Halsey LLP (57) ABSTRACT

A position detecting device and a takeout apparatus capable of obtaining information on height or stage number of an object in a stack of objects by a two-dimensional image capturing device for an operation of taking out the object by a robot. A CCD camera is arranged at a position above a place where workpieces stacked in multiple stages are provided. An image processing device determines a size of the image of the uppermost workpiece in a two-dimensional image captured by the camera. The height or stage number of the workpiece is determined from the size of the workpiece image using a stored relation table or arithmetic expression representing relationship between the height or stage number of the workpiece and the size of the workpiece. For a plurality of kinds of workpieces, the relation table/arithmetic expression is stored for each kind of workpiece and selectively used in accordance of a mark on the workpiece which indicate the kind of workpiece. The obtained positional information on height or stage number is sent to a robot controller so that a robot is operated to a takeout position which is corrected based on the positional information for taking out the workpiece from a stack of workpieces.

26 Claims, 7 Drawing Sheets

POSITION DETECTING DEVICE AND TAKEOUT APPARATUS WITH POSITION DETECTING DEVICE

BACKGROUND OF THE INVENTION

1. Field of the Invention

The present invention relates to a position detecting device suitable for use in handling a workpiece by a robot for an operation of taking out workpieces stacked in multiple stages or piling up workpieces successively, and takeout apparatus using the position detecting device.

2. Description of Related Art

In an operation of taking out workpieces stacked in multiple stages successively by a robot, the number of stages of the stacked workpieces and thus a position (particularly in a height direction) of the workpiece to be taken up change. In such a case, a sensor is used to recognize the position of the workpiece to be taken up. In this case, it has been deemed to be difficult to recognize the number of stages or height of the stacked workpieces based solely on information obtained by a two-dimensional image capturing device such as a camera.

For this reason, the detection of the number of stages of the workpieces has been realized by methods such as one that uses a contact sensor for measuring height of an upper surface of the stacked workpieces, one that utilizes a so-called stereograph to detect the height of the workpieces based on images captured by two or more cameras, and one that uses a projection of a plurality of slit lights on the workpieces to obtain a three-dimensional image of the workpieces.

However, use of the contact sensor for measuring height of the stacked workpieces has a problem of failing in contact with the upper surface of the workpieces if the workpieces are displaced in a horizontal plane. Thus, in order to avoid this problem, it is necessary to use a two-dimensional visual sensor in combination with the contact sensor. In addition, the method of the stereograph also has problems of need for installation of a plurality of cameras and processing for establish coordination between a plurality of images captured by the plurality of cameras is required for realizing the detection of height of the stacked workpieces, and a difficulty in establishing the coordination.

SUMMARY OF THE INVENTION

An object of the present invention is to provide a position detecting device capable of detecting position of objects stacked in multiple stages by a simple arrangement using two-dimensional image capturing means without requiring arrangement and processing for the stereograph. Another object of the present invention is to provide a takeout apparatus capable of performing an operation of taking out the object easily using the position detecting device.

The present invention makes use of information on a size of an image of an object in a two-dimensional image captured by the two-dimensional image capturing means to obtain positional information on height or stage number of the object. In addition, the present invention also provides an apparatus for performing an operation of taking out the object using the obtained positional information of the object. According to the present invention, the positional information on the height or stage number of the object can be obtained based on the two-dimensional image of the object, and therefore the information on the height or stage number of an object in a stack of objects in multiple stages is obtained by a more simple arrangement than that in the conventional method, and the operation of taking out the object using the positional information is also realized.

The position detecting device of the present invention comprises: image capturing means having an optical component for capturing a two-dimensional image including an image of an object; image processing means for determining a size of an image of the object in the two-dimensional image captured by the image capturing means; storing means for storing relational information on a relationship between a distance from a reference position on an optical axis of the optical component of the image capturing means to the object on the optical axis, and the size of the image of the object in the two-dimensional image; and distance determining means for obtaining information on a distance from the reference position to the object in the direction of the optical axis based on the size of the image of the object determined by the image processing means and the relational information stored in the storing means.

The reference position may be set in the image capturing means (for example at a position of a lens of a camera).

The image capturing means may be arranged at a position above an uppermost one of workpieces of the same kind stacked in multiple stages on a loading plane, to capture a two-dimensional image including an image of the uppermost workpiece as the object. In this case, the reference position may be set to a position on the loading plane or a position of a workpiece at a predetermined stage in the stacked workpieces.

The distance determining means may obtain a distance between the reference position and the uppermost workpiece, or a stage number of the uppermost workpiece in the stacked workpieces calculated from the reference position.

The storing means may store a relation table representing a relationship between the size of the image of the uppermost workpiece in the two-dimensional image and the stage number of the uppermost workpiece, and in this case, the distance determining means determines the stage number of the uppermost workpiece using the relation table. Alternatively, the storing means may store an arithmetic expression representing a relationship between the size of the image of the uppermost workpiece in the two-dimensional image and the stage number of the uppermost workpiece, and in this case the distance determining means determines the stage number of the uppermost workpiece using the arithmetic expression.

The position detecting device of the present invention may further comprise input means for inputting information on a distance between the reference position and the uppermost workpiece, and storing means may store the relational information obtained based on two-dimensional images including images of the uppermost workpieces of different stack numbers captured by the image capturing means and the information on distances between the reference position and the respective uppermost workpieces inputted through the input means.

The image capturing means may be mounted on a moving mechanism so that position of the image capturing means is changed by the moving mechanism. In this case, the moving mechanism is controlled such that the stacked workpieces is covered within a field of view of the image capturing means.

The image capturing means may capture two-dimensional images including images of uppermost workpieces of a plurality of stacks of workpieces placed at different positions, and the distance determining means may determine the highest stack of workpieces in the plurality of stacks of workpieces, and may determine height or stage numbers of respective uppermost workpieces in the plurality of stacks of workpieces and thus the number of workpieces in respective stacks.

The position detecting device of the present invention may further comprise setting means for setting information on kind of workpiece. In this case, the moving mechanism may change the position of the image capturing means such that at least one of a plurality of stacks of workpieces of different kinds placed around the moving mechanism is covered within a filed of view of the image capturing means, and the distance determining means may obtain the information on the distance in accordance with the information on kind of workpiece set by the setting means.

The setting means may set the information on kind of workpiece according to a program command, an external signal or parameters, and alternatively, the setting means may set the information on kind of workpiece based on image processing of an image of the workpiece or image processing of a mark on the workpiece for indicating the kind of workpiece.

The position detecting device of the present invention may be combined with an object takeout means to constitute a takeout apparatus for taking out the object. In this case, the takeout apparatus may comprise takeout position determining means for determining a position for taking out the object by the object takeout device based on the information on the distance from the reference position to the object in the direction of the optical axis determined by the distance determining means.

The takeout apparatus may further comprise two-dimensional position determining means for obtaining information on two-dimensional position and/or orientation of the object based on the image of the object in the two-dimensional image captured by the image capturing means. In this case, the takeout position determining means may determine the position for taking out the object based on a combination of the information on two-dimensional position and/or orientation of the object determined by the two-dimensional position determining means and the information on the distance from the reference position to the object in the direction of the optical axis determined by the distance determining means.

The takeout position determining means may correct the two-dimensional position of the object using the information on the data representing a distance from the reference position to the object in the direction of the optical axis, to thereby correct the position for taking out the object.

The distance determining means may obtain height or the number of stages of objects stacked in multiple stages to determine the number of objects, and in this case, the takeout apparatus may further comprise display means for displaying a notice or means for sending a signal to an external device when the number of objects reaches a predetermined value.

DETAILED DESCRIPTION OF THE PREFERRED EMBODIMENTS

Figure 1:
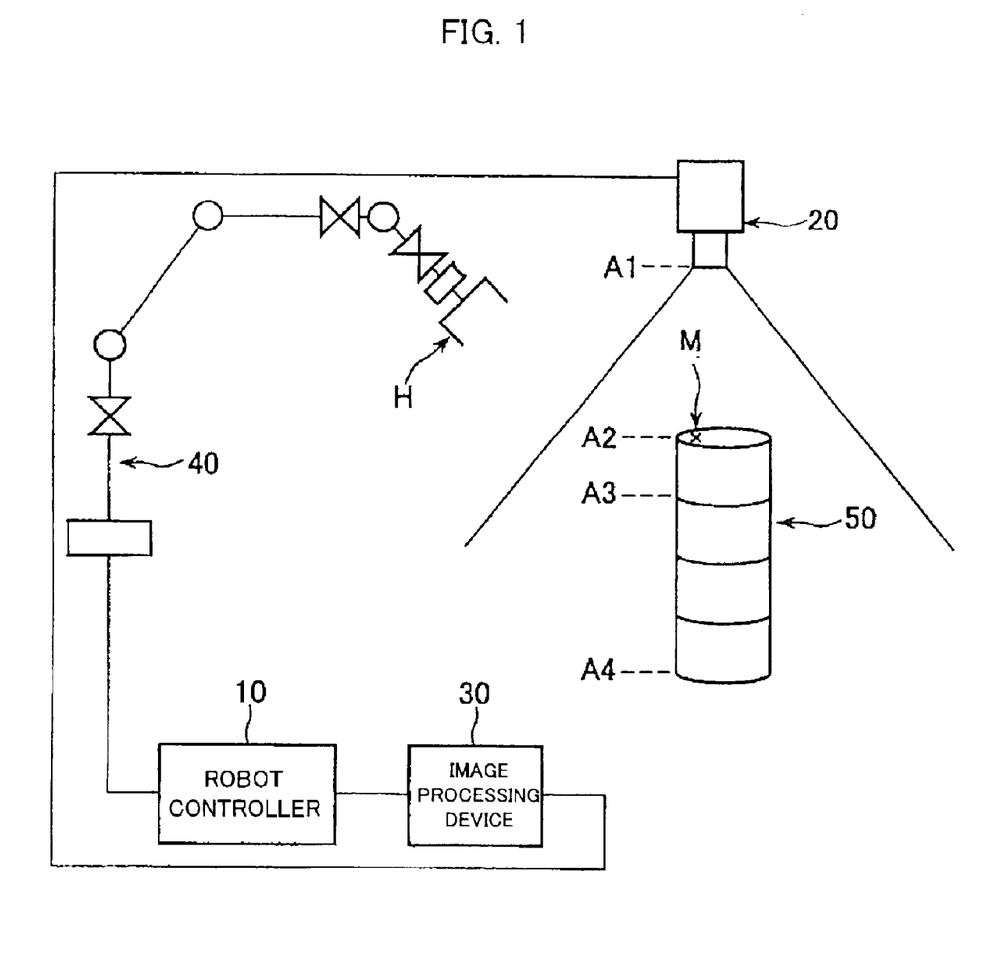
FIG. 1 is a schematic diagram of an overall configuration of a workpiece takeout apparatus according to an embodiment of the present invention.

FIG. 1 shows an overall configuration of an apparatus for taking out workpieces one by one according to an embodiment of the present invention. A plurality of workpieces 50 (four workpieces in this example) are placed at a predetermined position to form a stack of workpieces in multiple stages. A CCD camera 20 for capturing a two-dimensional image of an object is arranged above the stack of workpieces. In this embodiment, the CCD camera 20 is arranged at a fixed position and any mechanism for moving the CCD camera 20 is not provided.

The CCD camera 20 constitutes a two-dimensional visual sensor in combination with an image processing device 30, and a two-dimensional image including an image of the workpieces 50 is captured by the CCD camera 20 in response to a command issued by the image processing device 30. The image processing device 30 detects an uppermost workpiece 50 in the stack of workpieces 50 in the two-dimensional image captured by the CCD camera 20 and obtains position/orientation (e.g., two-dimensional position and orientation on a plane) and size of the detected uppermost workpiece in the captured image. In addition, the image processing device determines a distance between the CCD camera 20 and the uppermost workpiece 50, or height or stage number of the uppermost workpiece (which indicates the uppermost workpiece is positioned at state from the bottom) using the detected size of the uppermost workpiece in the captured two-dimensional image. How to determine the above information will be described later.

The image processing device 30 is connected to a robot controller 10 for controlling a robot 40. The data (including the information such as the two-dimensional position/orientation of the uppermost workpiece 50, the distance between the uppermost workpiece 50 and the CCD camera, the height or stage number of the uppermost workpiece) obtained by the image processing device 30 are sent to the robot controller 10. An operation program for holding the uppermost workpiece 50 of the stacked workpieces 50 with a hand H is taught to the robot 40 in advance. There are a displacement between the taught two-dimensional position/orientation and the actual two-dimensional position/orientation and a displacement between the taught height of the uppermost workpiece 50 and the actual height of the uppermost workpiece 50 in practice.

The robot controller 10 performs a playback operation of the taught operation program to operate the robot 40 for taking out the workpieces 50 one by one. A target position in the operation of taking out the uppermost workpiece 50 is corrected on the basis of the data including the above information received from the image processing device 30.

Figure 2:
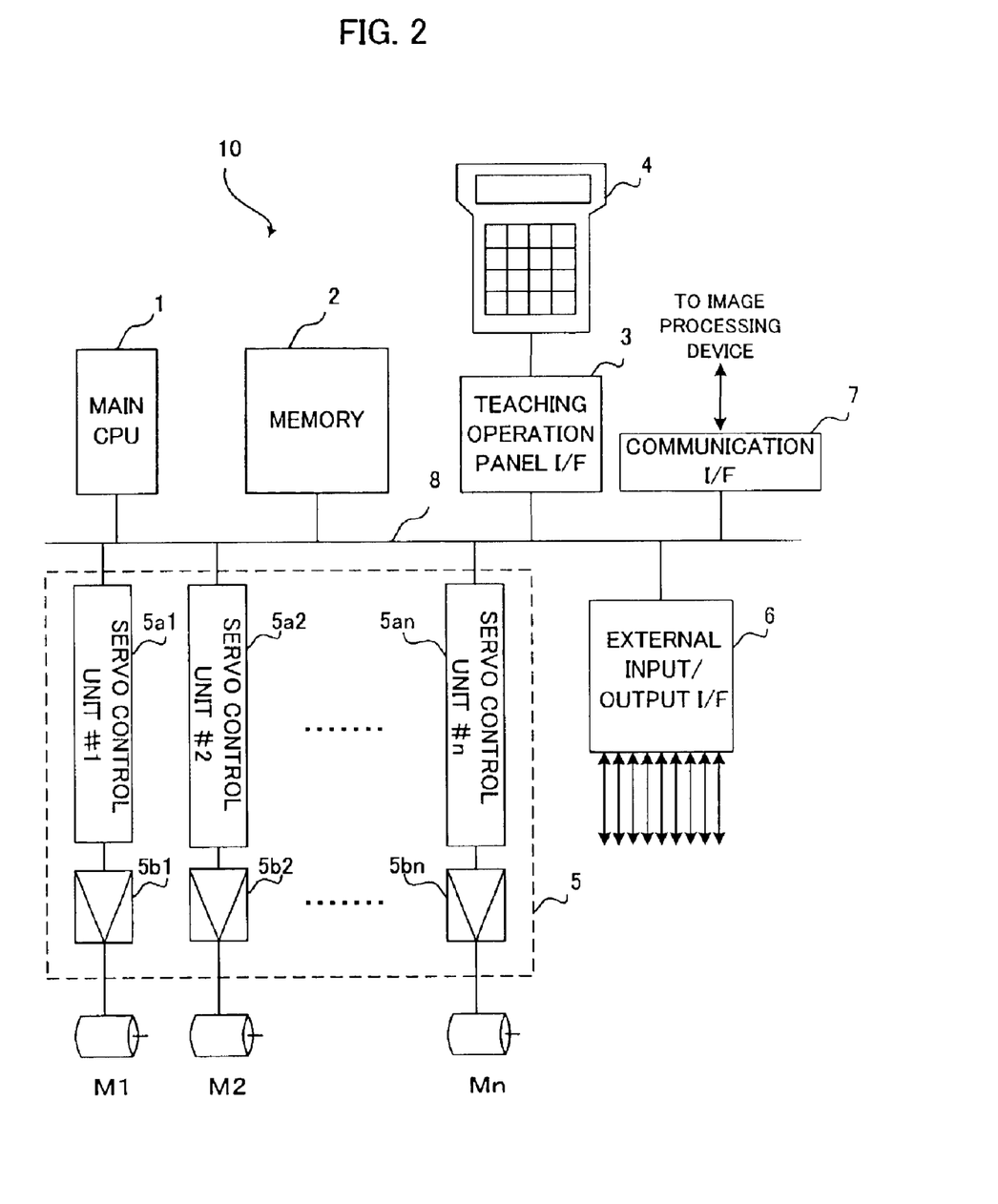
FIG. 2 is a block diagram of main components of a robot controller used in the embodiment.

FIG. 2 is a block diagram showing main components of the robot controller 10. A well-known hardware architecture of a robot controller is applicable to the robot controller 10.

Specifically, a main CPU 1, a memory 2, a teaching operation panel interface 3, a servo control section 5, an external input/output interface 6 and a communication interface 7 are connected to a bus line 8.

The memory 2 stores a system program for the main CPU 1 to generally control the entire system, operation programs taught for the operations of the robot 40, taught data related to the taught operation programs and various parameters.

A teaching operation panel 4 is connected to the teaching operation panel interface 3 to enable various manual operations such as a jog operation, starting of a playback operation and an emergency stop of the operation, as well as input and correction of various programs and parameters.

The servo control section 5 comprises servo control units 5a1–5an of the number corresponding to the number "n" of servo-controlled axes. The servo control units 5a1–5an drivingly control servo motors M1–Mn through servo amplifiers 5b1–5bn, respectively. The external input/output interface 6 is provided for inputting signals from external equipments and outputting signals to the external equipments, and is used for inputting a signal indicating the kind of workpieces 50 from a workpiece feeding section, and for outputting a signal indicating that the stage number of the uppermost workpiece 50 reaches a predetermined value (of "1", for instance) to the workpiece feeding section. The determination that the stage number of the uppermost workpiece 50 reaches the predetermined value is performed by the image processing device 30, and the determination is sent to the robot controller 10 through the communication interface 7. The communication interface 7 performs transfer of data to and from the image processing device 30 through a communication line, and in this embodiment, various information on the workpiece 50 is sent from the image processing device 30 to the robot controller 10 via the communication line.

Figure 3:
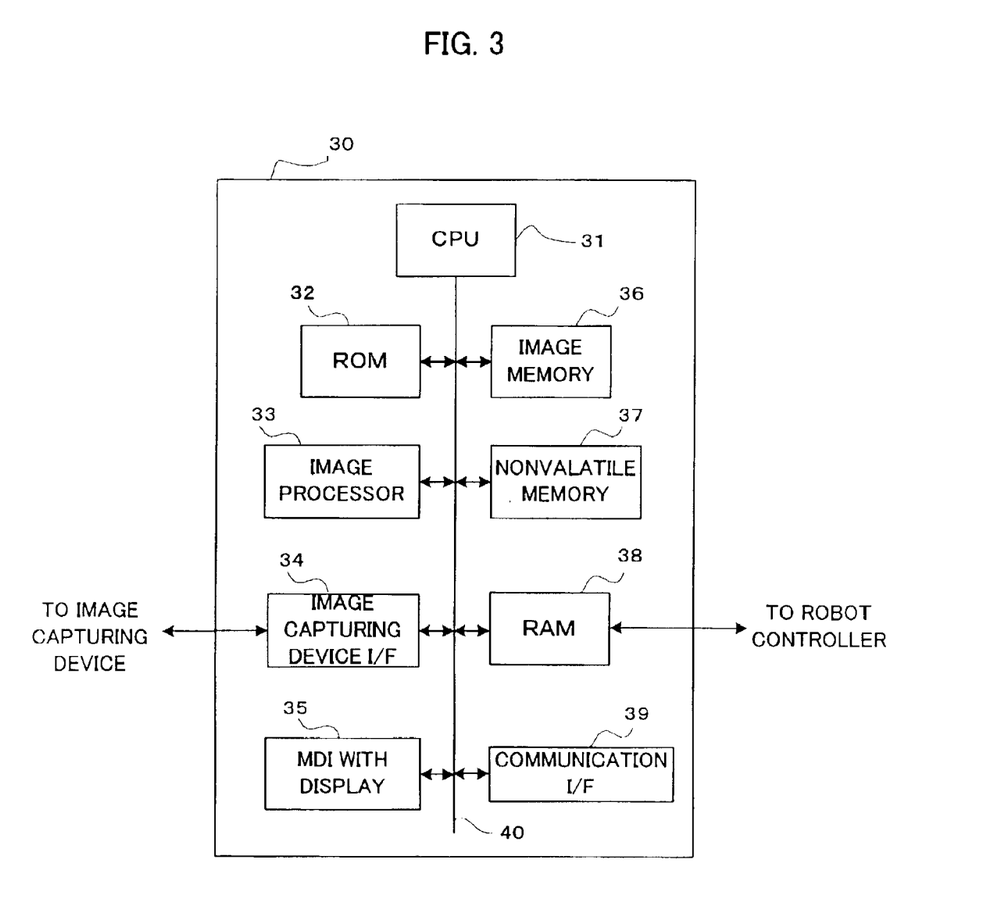
FIG. 3 is a block diagram of main components of an image processing device used in the embodiment.

FIG. 3 shows main components of the image processing device 30. A hardware architecture of a well-known image processing device is applicable to the image processing device 30. Specifically, a CPU 31, a ROM 32, an image processor 33, an image capturing device interface 34, a manual data input device (MDI) 35 with a display device, an image memory 36, a nonvolatile memory 37, a RAM 38 and a communication interface 39 are connected to a bus line 40.

In the ROM 32, a system program for the CPU 31 to generally control the image processing device 30 is stored. In the image memory 36, image data sent from the image capturing device through the interface 34 and image data such as gradation data obtained by image processing performed by the image processor 33 based on the sent image data are stored. The manual data input device (MDI) 35 provides a man-machine interface for the image processing device 30 to allow manual operations such as input, editing and correction of the program data and the parameters. The RAM 38 is mainly used for temporary storage of data in arithmetic processing by the CPU 31. The communication interface 39 is connected to the communication interface 7 of the robot controller 10 via a communication line, and is used for transferring various data and signals between the robot controller 10 and the image processing device 30.

In the nonvolatile memory 37, data such as programs used for the image processing and analysis and parameters related to the programs are stored. These data includes information on a relationship between a size of an image of a detected workpiece 50 in the captured image and a distance from a predetermined position on an optical axis of the CCD camera 20 to the detected workpiece 50 in a direction of the optical axis, and a program and parameters for determining a distance from the predetermined position on the optical axis of the CCD camera 20 to the detected workpiece 50 based on the above relationship and a size of the image of the detected workpiece 50 in the imaging plane.

As described, the CCD camera 20 captures a two-dimensional image including an image of the workpiece 50 in response to a command issued from the image processing device 30. The captured two-dimensional image data are converted into gradation data by the image processing device 30 and stored in the image memory 36. Various conventional methods are applicable to determine position and size of the two-dimensional image of the workpiece 50 in the captured image.

For instance, there is a method in which the obtained image data are converted into binary image data composed of bright and dark pixel regions using a threshold value of an appropriate brightness, so that a shape of the image of the workpiece is determined as a bright or dark pixel region. The position of the image of the workpiece in the imaging frame is determined on the basis of a center of gravity of the bright or dark pixel region defining the shape of the image of the workpiece. The size of the image of the workpiece in the imaging frame is obtained on the basis of an area or a length of a principal axis of inertia of the pixel region defining the shape of the image of the workpiece. Alternatively, a template matching method by a so-called normalized correlation process may be also used. In this method, an image region of the workpiece to be detected is taught and stored as a template in advance, and the position having the maximal correlation in pixel value between the image captured by the camera and the template is obtained.

In the template matching, there is also provided a well-known method for using a plurality of templates having different sizes provided by enlarging or reducing a taught template image to obtain a correlation in order to meet a change of the size of the image of the uppermost workpiece 50, to simultaneously calculate the position and the size of the image of the uppermost workpiece (such as the relative size of the detected workpiece on the basis of the size of a standard template). Thus, this method may be also applied to determine the position and the size of the image of the uppermost workpiece according to the present invention.

A method of obtaining data on height or stage number of the detected workpiece using the obtained information on the position and the size of the image of the uppermost workpiece in the imaging frame will be described.

It is generally well known that projection by the camera for obtaining a two-dimensional image may be approximated to perspective projection by a pinhole camera. In the perspective projection, it is also well known that the size of an image projected onto an imaging plane (e.g., a CCD pixel plane of the CCD camera 20 in this embodiment) is inversely proportional to a distance Z between an object and a center of projection, i.e. a focus of a lens.

Using the relationship between the distance Z and the size of the object, the distance Z between the uppermost workpiece and the CCD camera can be obtained based on the size of the image of the uppermost workpiece in the imaging frame. A length L (a length of the principal axis) of the image of the workpiece in a specific direction (a direction of the principal axis) or a length of one side of the image of the workpiece is obtained as an index representing the size of the image of the workpiece 50 by the image processing by the image processing device 30 in this embodiment. Other indexes such as an area of the region of the workpiece image may be used to represent the size of the workpiece image.

First, in order to obtain the relationship between the distance Z and the size of the workpiece 50, a two-dimensional image including an image of the workpieces with the uppermost workpiece 50 positioned in a different stage of first to n-th stage is captured. Then, the size of the image of the uppermost workpiece 50 in each of the captured two-dimensional images is determined, to thereby obtain the size 1(i) (i=1, 2, 3 . . . n) of the image of the uppermost workpiece when the uppermost workpiece is positioned in the i-th stage. For obtaining the size 1(i) of the image of the workpiece at each stage, a single workpiece 50 may be placed in the i-th state so that an image of which is positioned at the center of the imaging frame, or a plurality of workpieces may be placed in the i-th stage and an average of the sizes of all the images of the workpieces is used as the size 1(i) of the image of the workpiece. Thus, based on the obtained data, a relation table indicating a relationship of the size L of the image of the uppermost workpiece 50 and the stage number of of the uppermost workpiece 50 corresponding to the distance Z is obtained.

Values in the relation table are stored in the nonvolatile memory 37 of the image processing device 30. In actual detection, a two-dimensional image including an image of the uppermost workpiece 50 is captured and the size L of the image of the uppermost workpiece 50 is determined. Then, referring to the relation table, the value of the size 1(i) of the workpiece image in the relation table, which is most approximate to the value of the size L of the image of the detected workpiece is determined. Then, the value i corresponding to the size 1(i) is read out from the relation table, to thereby determine the stage number of the uppermost workpiece 50.

The above processing for determining the stage number "i" of the uppermost workpiece is performed by the CPU 31 of the image processing device 30 in this embodiment. Alternatively, the processing may be performed by the CPU 1 of the robot controller 10, and in this case the size L of the workpiece image determined by the CPU 31 of the image processing device 30 is sent to the robot controller 10 and the CPU1 of the robot controller 10 determines the state number of the uppermost workpiece referring to the data in the relation table stored in the memory 2 of the robot controller 10.

The term of "stage number" is typically used as stage number "1" of the first stage, stage number "2" of the second stage, stage number "3" of the third stage (the level A3 in FIG. 1), stage number "4" of the fourth stage (the uppermost stage, i.e., the level A2 in FIG. 1), . . . , which are counted upwardly from the loading plane (the level A4 in FIG. 1). Alternatively, other counting of the "stage number" may be also used. For instance, if the level A2 in FIG. 1 is set to a reference stage, which is a level of the upper surface of the uppermost workpiece of a new stack of the workpieces 50, stage number "0" is assigned to the workpiece having an upper surface at the level A2 and stage number "−1" is assigned to the workpiece having an upper surface at the level A3. Similarly, when the level A3 is set to the reference stage, stage number "0" is assigned to the workpiece having an upper surface at the level A3 and stage number "+1" is assigned to the workpiece having an upper surface at the level A2.

Alternatively, an arithmetic expression representing the relationship between the size L of the workpiece image and the height of the workpiece may be used to determine the stage number i or height h of the uppermost workpiece based on the detected size of the workpiece image. In an ideal camera establishing the central projection, the size (the length) of the workpiece image is inversely proportional to a distance between a focus of the camera and the workpiece.

Thus, the relationship between the size L of the workpiece image and the stage number i of the workpiece can be expressed by an appropriate approximate expression using the known heights of the stacks of the workpieces of the respective stages. For instance, a linear or quadratic or higher degree polynomial expression may be used for the approximate expression of the relationship between the size L of the workpiece image and the workpiece height H. Coefficients of the approximate expression may be stored in the memory of the image processing device 30 or the robot controller 10 to be used for determining the workpiece height H based on the size L of the workpiece image in the captured two-dimensional image. The expression may be prepared for determining the stage number i of the uppermost workpiece instead of the workpiece height H.

Since it is usual that a different kind of workpiece has a different thickness, the height of the uppermost workpiece varies depending on the kind of workpiece, and thus the relationship between the size of the uppermost workpiece image and the stage number or the height of the workpiece varies in dependence of the kind of workpiece 50. Thus, in a case of handling plural kinds of workpieces, the relation table or the relational expression is prepared for each kind of workpiece and stored in the memory of the image processing device 30 or the robot controller 10.

In an actual determination of the height/stage number of the workpiece, in order to decide which relation table or arithmetic expression should be referred to, the image processing device 30 recognize a characteristic mark M made on the workpiece 50, for instance, to determine of the kind of workpiece, and obtain the information on the height/stage number of the workpiece referring to the relational table/arithmetic expression prepared for the determined kind of workpiece. A bar code may be also used as the mark M, for instance. Alternatively, the mark M may be a label with printed figures (circle, triangle, square, etc. discriminable by the image processing) attached to the workpiece for the determination of the kind of workpiece.

Further, a plurality of kinds of programs for determining the height/stage number of the workpiece on the basis of the size of the workpiece image may be prepared and stored in the memory of the image processing device 30, and a program to be used for the kind of workpiece may be specified by a manual input or an external signal. Alternatively, parameters for a common program may be specified by manual input or external signal.

Figure 4:
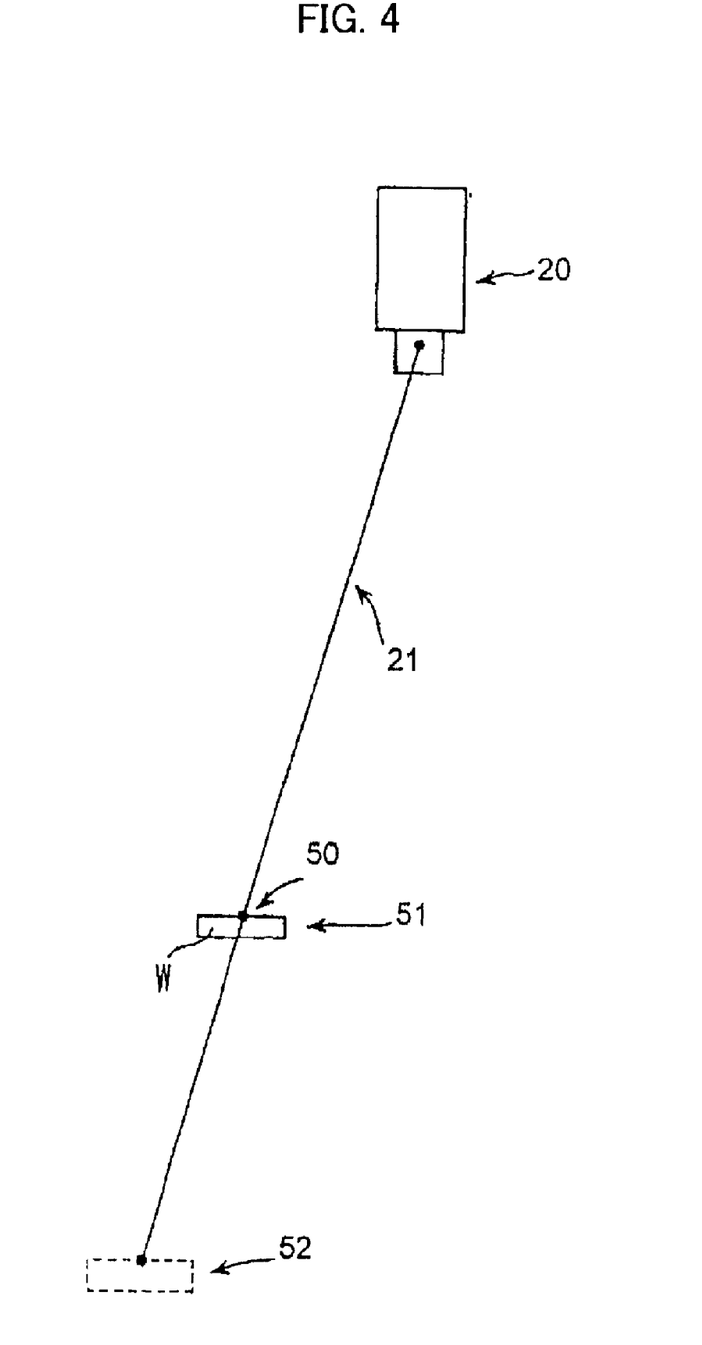
FIG. 4 is a diagram showing processing for converting a two-dimensional position of an image of the workpiece into a two-dimensional position of the workpiece in a coordinate system set to a robot.

Referring to FIG. 4, description will be made on processing of converting the coordinate position of the image of the workpiece 50 in the imaging plane into a coordinate position in a coordinate system of the robot 40 or an equivalent mechanism for taking out the workpiece. On a coordinate system for expressing the position of the workpiece image in the imaging plane, the size of the image capturing element (pixel) of the CCD camera may be used as a unit to express a distance. It is necessary to convert the coordinate position in the coordinate system set to the imaging plane into coordinate position in the robot coordinate system for taking out the workpiece 50 by the robot 40 using the detected position of the workpiece image.

Data for the conversion between the coordinate systems is obtained by the processing of the well-known calibration. For instance, correspondence in direction and scale between the coordinate system set to the imaging plane and the robot coordinate system is established by recognizing images of two points, positions of which are known in the robot coordinate system, in the image frame or by specifying the two points on the imaging frame by an operator. However, in the above calibration method, the relationship between an interval of pixels of the imaging plane and the scale of the robot coordinate system changes as the distance between the workpiece and the CCD camera is changed, so that an error between the coordinate position in the camera coordinate system and the coordinate position converted into the robot coordinate system is made large.

As shown in FIG. 4, points on a line of sight 21 passing through the focus of the CCD camera 20 form images at the same pixel position in the imaging plane according to the characteristics of perspective projection. For instance, when the workpiece 50 is either at a position 51 or 52, these positions are on the same line of sight 21, and therefore, may be recognized as the same position on screen. The more the positions 51 and 52 are distant from each other, and the more the line of sight 21 is away from the center of the optical axis of the CCD camera (that is, the more the workpiece position is away from the center of the workpiece image), it will have a more effect of the perspective projection on the above conversion processing. Accordingly, some correction is required in these cases.

For correcting the error in the conversion, instance, the calibration is performed for each stage of the stacked workpieces and storing the conversion parameters regarding the scales of the image coordinate system and the robot coordinate system for each stage of the stacked workpieces (the relationship between the direction in the image coordinate system and the direction in the robot coordinate system remains unchanged and therefore only a change of the scale has to be considered). Then, a value of the scale for the stage number of the workpiece determined based on the workpiece image is used to in the conversion of the coordinate position in the image coordinate system into the coordinate position in the robot coordinate system.

With the above correction, a robot handling position can be obtained accurately irrespective of the change of the workpiece height. In the case of handling plural kinds of workpieces, the relation tables or the arithmetic expressions representing the relationship between the size of the workpiece image and the workpiece height are stored for the respective kinds of workpieces, to cope with various kinds of workpieces by selecting the relation table or the arithmetic expression in accordance with the kind of the workpiece.

The height H may be calculated on the basis of the loading plane A4 as shown in FIG. 1, or otherwise, other reference positions may be also adopted in the same manner as that in the stage number. For instance, the level A2 (the uppermost level) or the level A3 or other level of a predetermined stage may be also set to a reference height of "zero". Further, the level A1 of a lens plane of the CCD camera 20 may be also used as a reference position. In this case, height information corresponds to "the distance between the CCD camera 20 and the uppermost workpiece 50".

Figure 5:
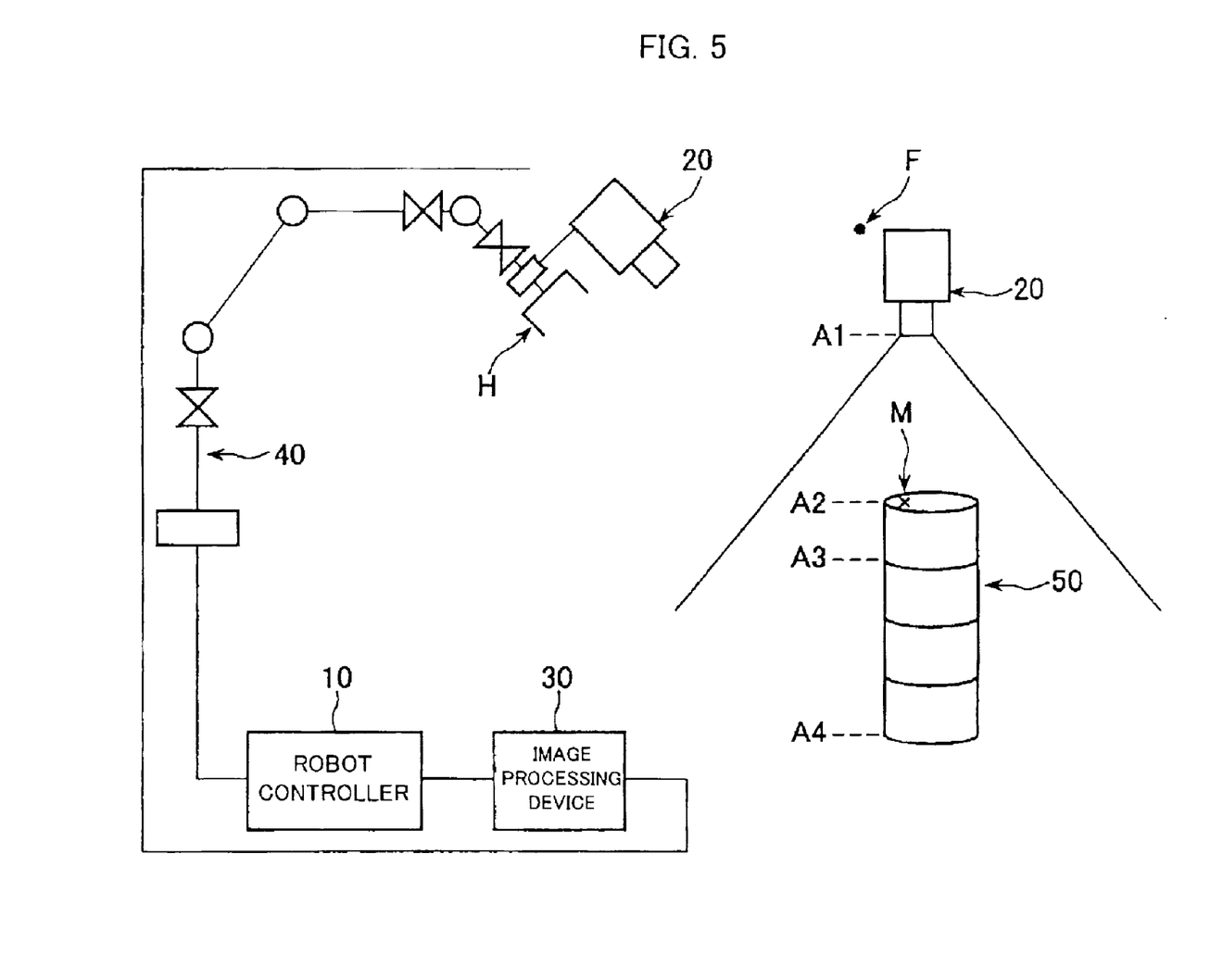
FIG. 5 is a schematic diagram of an overall configuration of a workpiece takeout apparatus according to another embodiment of the present invention.

In the above embodiment, the CCD camera 20 is arranged in fixed position and any mechanism for moving the CCD camera is not provided. Alternatively, the CCD camera 20 may be arranged movably by mounting the camera on a moving mechanism. A robot may be typically used as the moving mechanism, and in this case, the robot may perform the operation of taking out the workpiece, as shown in FIG. 5 according to another embodiment of the present invention. A workpiece takeout system of this embodiment is similar in arrangement to the system shown in FIG. 1 except that the CCD camera 20 in this embodiment is mounted on the robot 40, and therefore a repetitive description on the overall arrangement and individual components is omitted.

Figure 6:
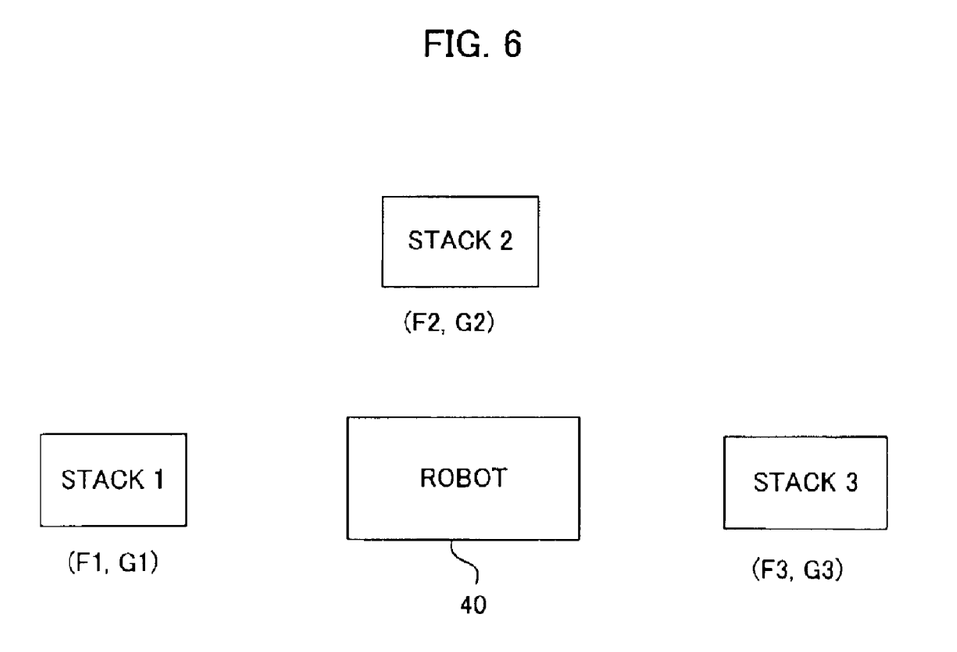
FIG. 6 is a diagram showing a takeout operation for a plurality of stacks of workpieces.
Figure 7:
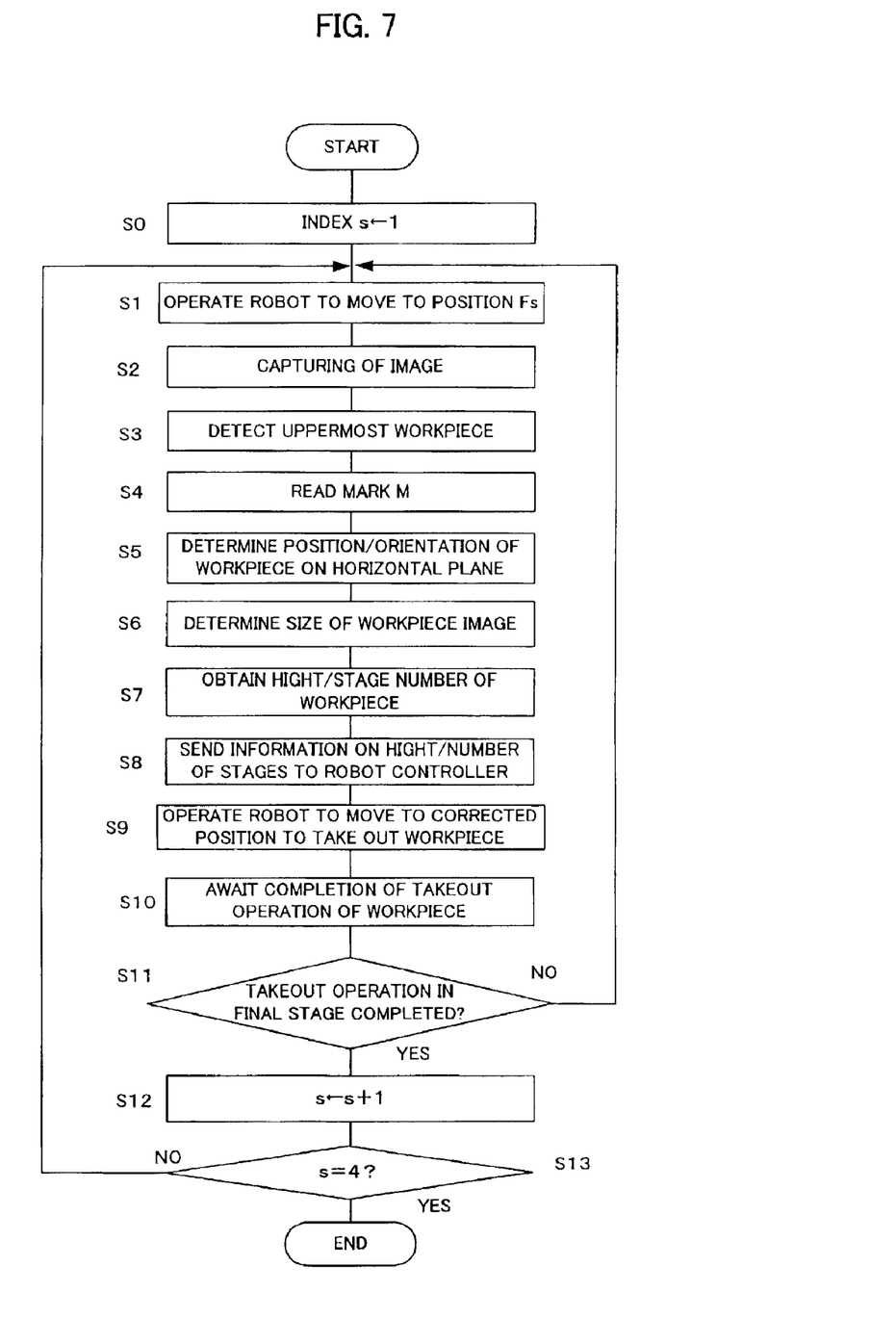
FIG. 7 is a flowchart showing a takeout operation for the plurality of stacks of workpieces.

A procedure for taking out workpieces one by one by the robot 40 as shown in FIG. 5 from three stacks 1, 2 and 3 of workpieces as shown in FIG. 6 will be described referring to a flowchart of FIG. 7. In this example, the kind of workpiece is determined by recognizing the mark M on the workpiece. Further, it is premised that the data representing the relationship between the stage number on the basis of the loading plane A4 and the height (the distance from the uppermost workpiece to the CCD camera) on the basis of the lens plane Al are stored in the nonvolatile memory 37 of the image processing device 30 for each kind of workpiece in the form of the relation table or the arithmetic expression (the coefficient of the expression). Also, it is premised that positions F1, F2 and F3 at which the camera captures images of the stacks 1, 2 and 3 of workpieces, respectively, and positions G1, G2 and G3 for taking out the workpiece are taught in advance of the workpiece taking-up operation. It should be noted that the taught positions for taking out the workpiece are amended for use in the handling the workpiece.

The steps in the procedure of the workpiece takeout operation will be summarized as follows.

Step S0: The CPU 31 of the image processing device 30 initializes an index s (provided in the memory) indicating the stack number to "1", and sends the initial value to the robot controller 10.

Step S1: The robot controller 10 operates the robot 40 to move to the detection position Fs for detecting of an s-th stack.

Step S2; The image processing device 30 outputs a command to the CCD camera 20 to capture an image. In response to the command, the CCD camera 20 captures an image of the s-th stack of the workpieces and a signal representing the captured image is sent to the image processing device 30.

Step S3: The image processing device 30 determines position of an image of the uppermost workpiece. How to determine the position of the uppermost workpiece is already described.

Step S4: The mark M is read and the image processing device 30 recognizes the kind of workpiece on the basis of the read mark.

Step S5: The two-dimensional position/orientation of the workpiece are determined based on the position/orientation of the workpiece image and the calibration data.

Step S6: The size of the workpiece image is determined. How to determine the size of the workpiece image is already described.

Step S7: Access to the relation table/arithmetic expression is made according to the determination result in Step S4 to obtain the information on the height/stage number of the detected workpiece based on the size of the workpiece image determined in Step S4. In this example, the height/stage number of the detected workpiece on the basis of the loading plane A4 is obtained.

Step S8: The information on the height/stage number of the workpiece obtained in Step S7 is transferred to the robot controller 10 together with the data on the two-dimensional position/orientation of the workpiece obtained in Step S5.

Step S9: The taught takeout position Gs is corrected using the information transferred in Step S8 and the robot 40 is operated to move to the corrected takeout position to perform the takeout operation (holding and carriage).

Step S10: The image processing device 30 waits for a notice of completion of the operation of taking out the uppermost workpiece by the robot 40 from the robot controller 10.

Step S11: It is determined whether or not the workpiece to be pucked up in Step S9 is a workpiece of the final stage based on the information on the height/stage number of the workpiece obtained in Step S7. If a result of determination in Step S11 is YES, an alarm is displayed on the display device of the MDI 35 of the image processing device 30 (an alarm by sound may be also used) and the procedure proceeds to Step S12. If the result of determination in Step S11 is NO, the procedure returns to Step S1 to repeatedly execute the processes of Steps S1–S11.

Step S12: The CPU 31 of the image processing device 30 incrementally increases the index s indicating the stack number by "1".

Step S13: The processing is terminated if the index s reaches the sum of the number of stacks (such as "3" in this example) and "1". If the index s does not exceed the number of stacks, the procedure returns to Step 1 to repeat the processes of Step S1 and subsequent Steps for the next stack of workpieces.

With the above procedure, the robot 40 can perform operations of taking out all the workpieces from the stacks 1, 2 and 3 successively. Before starting the takeout operations, the detection of the height/stage number may be performed with respect to each of the stacks 1 to 3 as occasion demands, to obtain data on the height/stage number of each of the stacks 1 to 3, thereby determining the order of heights of the stacks to display such as "the highest stack", "the stack with the largest number of stage", etc. In addition, an alarm or an operation interrupt command may be also given when the height/stage number of each stack is determined to be excessively high or large.

According to the present invention, using the two-dimensional image capturing means, a distance between the two-dimensional image capturing means and an uppermost workpiece, or the height or stage number of the workpiece can be detected, so that the positional information on the stack of workpieces in the height direction by a simple device in comparison with an existing device such as one that uses a contact sensor, one that uses a stereo observation and one that uses a projection of slit lights. In particular, the present invention provides simple means for obtaining the stage number of the uppermost workpiece of the stacked workpieces, whereby the position of the workpiece required for handling operation by the moving mechanism such as the robot is obtained.

The position/orientation of the workpiece in a horizontal plane for taking out the workpiece by determining the position and/or orientation of the workpiece image in the captured two-dimensional image. In addition, the error (parallax) of the workpiece position on the horizontal plate depending on the height/stage number the workpiece is corrected to perform more precise detection of the two-dimensional position of the workpiece.

By capturing a plurality of images including the workpiece images at different stages and inputting the information on the workpiece height (the distance between the two-dimensional image capturing means and the workpiece, the height/stage number of the workpiece), the information on the relationship between the workpiece size and the workpiece height is easily obtained. The two-dimensional image capturing device may be mounted on the moving mechanism such as the robot, thereby allowing variations of the position/orientation of the two-dimensional image capturing device.

The robot is operated such that the workpiece is covered in the field of view of the two-dimensional image capturing device for stable measurement. In the case where stacks of workpieces are placed in different positions, the highest one of the stacks of workpieces is determined and the takeout operation is started from the workpiece at the highest position, to thereby prevent an interference between the hand of the robot and the workpiece. To determine the number of workpieces in a stack or stacks is to determine the number of residual workpieces to be taken up by the robot hand, to thereby determine time for providing a new stack of workpieces.

When the number of residual workpieces reaches a predetermined value or less, an alarm may be issued to remind a provide of a new stack of workpieces. By setting the information on a plurality of kinds of workpieces and selecting appropriate information in the set information, the position detection of the plurality of kinds of workpieces can be performed by the same detecting device. The selection of the appropriate information in accordance with the kind of workpiece may be performed automatically according to a program based on information on the kind of workpiece sent from an external controller.

The kind of workpiece can be determined based on an image of a mark on the workpiece, to allow an automatic determination of the kind of workpiece.

The present invention also provides a workpiece takeout apparatus, wherein the information on the height/stage number of the objects provided in multiple stages is obtained by the two-dimensional image capturing device and the obtained information is used for performing the takeout operation of the object.

What is claimed is:

1. A position detecting device comprising:

image capturing means having an optical component for capturing a two-dimensional image including an image of an object;

image processing means for determining a size of an image of the object in the two-dimensional image captured by said image capturing means;

storing means for storing relational information on a relationship between a distance from a reference position on an optical axis of the optical component of said image capturing means to the object on the optical axis, and the size of the image of the object in the two-dimensional image; and distance determining means for obtaining information on a distance from the reference position to the object in the direction of the optical axis based on the size of the image of the object determined by said image processing means and said relational information stored in said storing means.

2. A position detecting device according to claim 1, wherein said reference position is set in said image capturing means.

3. A position detecting device according to claim 1, wherein said image capturing means is arranged at a position above an uppermost one of workpieces of the same kind stacked in multiple stages on a loading plane, to capture a two-dimensional image including an image of the uppermost workpiece as the object.

4. A position detecting device according to claim 3, wherein said reference position is set to a position on said loading plane or a position of a workpiece at a predetermined stage in the stacked workpieces.

5. A position detecting device according to claim 3, wherein said distance determining means obtains a distance between the reference position and the uppermost workpiece.

6. A position detecting device according to claim 3, wherein said distance determining means obtains a stage number of the uppermost workpiece in the stacked workpieces calculated from the reference position.

7. A position detecting device according to claim 6, wherein said storing means stores an arithmetic expression representing a relationship between the size of the image of the uppermost workpiece in the two-dimensional image and the stage number of the uppermost workpiece, and said distance determining means determines the stage number of the uppermost workpiece using the arithmetic expression.

8. A position detecting device according to claim 6, wherein said storing means stores a relation table representing a relationship between the size of the image of the uppermost workpiece in the two-dimensional image and the stage number of the uppermost workpiece, and said distance determining means determines the stage number of the uppermost workpiece using the relation table.

9. A position detecting device according to claim 3, further comprising input means for inputting information on a distance between the reference position and the uppermost workpiece, wherein said storing means stores the relational information obtained based on two-dimensional images including images of the uppermost workpieces of different stack numbers captured by said image capturing means and the information on distances between the reference position and the respective uppermost workpieces inputted through said input means.

10. A position detecting device according to claim 3, wherein said image capturing means captures two-dimensional images including images of uppermost workpieces of a plurality of stacks of workpieces placed at different positions, and said distance determining means determines the highest stack of workpieces in the plurality of stacks of workpieces.

11. A position detecting device according to claim 3, wherein said image capturing means captures two-dimensional images including images of uppermost workpieces of a plurality of stacks of workpieces placed at different positions, and said distance determining means determines height or stage numbers of respective uppermost workpieces in the plurality of stacks of workpieces and thus the number of workpieces in respective stacks.

12. A position detecting device according to claim 1, wherein said image capturing means is mounted on a moving mechanism so that position of said image capturing means is changed by said moving mechanism.

13. A position detecting device according to claim 12, wherein said moving mechanism is controlled such that the stacked workpieces is covered within a field of view of said image capturing means.

14. A position detecting device according to claim 12, further comprising setting means for setting information on kind of workpiece, wherein said moving mechanism changes the position of said image capturing means such that at least one of a plurality of stacks of workpieces of different kinds placed around said moving mechanism is covered within a filed of view of said image capturing means, and said distance determining means obtains the information on the distance in accordance with the information on kind of workpiece set by said setting means.

15. A position detecting device according to claim 14, wherein said setting means sets the information on kind of workpiece according to a program command, an external signal or parameters.

16. A position detecting device according to claim 14, wherein said setting means sets the information on kind of workpiece based on image processing of an image of the workpiece or image processing of a mark on the workpiece for indicating the kind of workpiece.

17. A takeout apparatus comprising:
object takeout means;
a position detecting device including: image capturing means having an optical component for capturing a two-dimensional image including an image of an object; image processing means for determining a size of an image of the object in the two-dimensional image captured by said image capturing means; storing means for storing relational information on a relationship between a distance from a reference position on an optical axis of the optical component of said image capturing means to the object on the optical axis, and the size of the image of the object in the two-dimensional image; and distance determining means for obtaining information on a distance from the reference position to the object in the direction of the optical axis based on the size of the image of the object determined by said image processing means and said relational information stored in said storing means; and
takeout position determining means for determining a position for taking out the object by said object takeout means based on the information on the distance from the reference position to the object in the direction of the optical axis determined by said distance determining means.

18. A takeout apparatus according to claim 17, further comprising two-dimensional position determining means for obtaining information on two-dimensional position and/or orientation of the object based on the image of the object in the two-dimensional image captured by said image capturing means, wherein said takeout position determining means determines the position for taking out the object based on a combination of the information on two-dimensional position and/or orientation of the object determined by said two-dimensional position determining means and the information on the distance from the reference position to the object in the direction of the optical axis determined by said distance determining means.

19. A takeout apparatus according to claim 18, wherein said takeout position determining means corrects the two-dimensional position of the object using the information on the data representing a distance from the reference position to the object in the direction of the optical axis, to thereby correct the position for taking out the object.

20. A takeout apparatus according to claim 17, wherein said distance determining means obtains height or the number of stages of objects stacked in multiple stages to determine the number of objects, and said takeout apparatus further comprises display means for displaying a notice when the number of objects reaches a predetermined value.

21. A takeout apparatus according to claim 17, wherein said distance determining means obtains height or the number of stages of objects stacked in multiple stages to determine the number of objects, and said takeout apparatus further comprises means for sending a signal to an external device when the number of objects reaches a predetermined value.

22. A position detecting device comprising:

an optical component capturing a two-dimensional image of an object;

an image processor determining a size of an image of the object in the captured two-dimensional image;

a memory storing relational information regarding a distance from a reference position on an optical axis of the optical component to the object on the optical axis, and the size of the image of the object in the two-dimensional image; and a distance processor obtaining information on a distance from a reference position to the object.

23. The position detecting device according to claim 22, wherein the relational information comprises a relation table representing a relationship between a size of the image of an uppermost workpiece in the two-dimensional image and a stage number of the uppermost workpiece, and the distance processor determines the stage number of the uppermost workpiece using the relation table.

24. A method of detecting a position, comprising:

capturing a two-dimensional image of an object with an optical component;

determining a size of an image of the object in the captured two-dimensional image;

storing relational information regarding a distance from a reference position on an optical axis of the optical component, and the size of the image of the object in the two-dimensional image; and determining a distance by obtaining information from the reference position to the object in the direction of the optical axis based on the size of the image of the object and said the stored relational information.

25. The method according to claim 24, further comprising positioning the optical component above an uppermost one of workpieces of a same kind stacked in multiple stages on a loading plane to capture a two-dimensional image including an image of the uppermost workpiece as the object.

26. The method according to claim 24, wherein the relational information comprises a relation table representing a relationship between a size of the image of an uppermost workpiece in the two-dimensional image and a stage number of the uppermost workpiece, and the determining a distance determines a stage number of the uppermost workpiece using the relation table.

* * * * *

UNITED STATES PATENT AND TRADEMARK OFFICE
CERTIFICATE OF CORRECTION

PATENT NO. : 6,898,486 B2
DATED : May 24, 2005
INVENTOR(S) : Atsushi Watanabe et al.

It is certified that error appears in the above-identified patent and that said Letters Patent is hereby corrected as shown below:

Drawings,
Fig. 3, Box 37, replace "NONVALATILE" with -- NONVOLATILE --.

Column 7,
Line 19, after "of" delete "of".

Column 10,
Line 35, after "Step s2" replace ";" with -- : --.

Column 11,
Line 8, replace "pucked" with -- picked --.

Signed and Sealed this

Seventh Day of March, 2006

JON W. DUDAS
*Director of the United States Patent and Trademark Office*